Dec. 24, 1968          D. P. HEARN          3,418,568
GEOPHYSICAL GRADIOMETER INCLUDING MEANS FOR DETERMINING
DISTANCE BETWEEN AIRBORNE BODIES
Filed March 9, 1966

INVENTOR
DANIEL P. HEARN

BY McLean, Morton & Bunstead

ATTORNEYS.

United States Patent Office 3,418,568
Patented Dec. 24, 1968

3,418,568
GEOPHYSICAL GRADIOMETER INCLUDING MEANS FOR DETERMINING DISTANCE BETWEEN AIRBORNE BODIES
Daniel P. Hearn, Tulsa, Okla., assignor, by mesne assignments, to Sinclair Research, Inc., New York, N.Y., a corporation of Delaware
Filed Mar. 9, 1966, Ser. No. 532,915
7 Claims. (Cl. 324—43)

ABSTRACT OF THE DISCLOSURE

An apparatus for the measurement of a magnetic gradient in the earth's magnetic field for assisting in electromagnetic geophysical prospecting with aircraft. An airplane tows two aerodynamic bodies at different heights with respect to the earth's surface. Each towed body contains a magnetometer. The distance between the aerodynamic bodies is determined by means of a sonic transmitter and receiver so that distance variations between said bodies may be corrected to provide magnetic gradient measurements accurately representing the earth's magnetic field.

Figure 1:
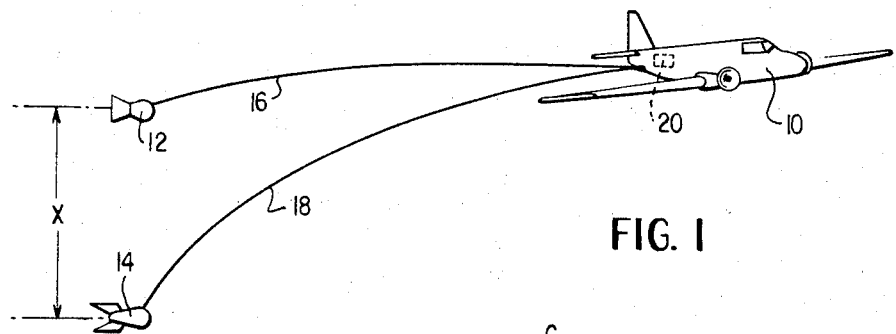

This invention relates to an apparatus for assisting in electromagnetic geophysical prospecting with aircraft. The particular object of this invention is to improve, simplify, and render more reliable present geophysical methods and apparatus used for carrying out airborne electromagnetic surveys.

Certain airborne methods have been developed for geophysical prospecting in which the earth's magnetic field is measured. In general, these methods measure the earth's magnetic field with equipment mounted in an aerodynamic device, i.e. bird, towed below and/or behind an aircraft to indicate the existence of magnetic anomalies e.g., ore deposits or petroleum deposits, in the earth's crust. The measurement of magnetic anomalies is, however, dependent upon time variations in the earths magnetic field, the relative distance between the aircraft and the bird, the angle of the aircraft relative to the bird, etc., and variation in these factors can at times be indistinguishable from variations caused by the desired deposit in the earth's crust thereby providing serious sources of error and rendering results provided by such geophysical prospecting methods inconclusive.

In an effort to overcome these limitations, systems have been heretofore designed wherein two devices for measuring the earth's magnetic field, hereinafter referred to as magnetometers are used in combination. In these systems one magnetometer is arranged on the ground in the survey area and the measurement of this magnetometer provides a base for normal measurement in the area. The other magnetometer is towed over the survey area and when its measurements are compared or correlated with the measurements of the first magnetometer the base or normal measurement of the first magnetometer assist in determining if a measured change in the earth's magnetic field is a natural time varying change or a change due to a change in the earth's magnetic susceptibility from the existence of a magnetic anomalies. Although the use of such a base or normal measurement reduces the possibility of error, errors are still present.

The present invention is directed to a system wherein these errors are eliminated or at least substantially reduced. In this system measurement of the earth's magnetic field is accomplished by measuring the difference between magnetic values at two positions along a component of the earth's magnetic field at the devices. For simplicity, this system will be described hereinbelow with regard to an arrangement suitable for measuring a vertical gradient along the vertical component of the earth's magnetic field. According to this system, magnetometers are brought close together and the difference in the measurements at each instrument is obtained. If the distance between the two magnetometers is kept constant, this difference provides a magnetic gradient which indicates the presence of magnetic anomalies and is unaffected by natural time variations in the earth's magnetic field. In such a system for measuring a magnetic gradient, however, since the magnetometers are arranged in separate aerodynamic devices, the distance between the magnetometers will actually vary due to air currents, etc., and this distance variation must be corrected for to provide a magnetic gradient accurately representing the earth's magnetic field. This invention is more specifically directed to a device for measuring this distance.

This invention is particularly suitable for use with metastable helium magnetometers which are one of the latest devices for measurement of magnetic field intensity. Such magnetometers operate on the principle of optical pumping of helium and are well known in the art.

In general, the system of this invention comprises two magnetometers, each supported in an aerodynamic body or bird suspended by a cable behind an airplane. One of the birds is designed to have a high drag so that it will fly directly behind the airplane whereas the other bird is weighted to fly beneath the airplane, e.g., approximately 50 to 100 ft. below the upper bird. Associated with each cable for suspending a bird are electrical conductors connecting the magnetometer in each bird to associate electrical apparatus in the airplane for amplifying and recording the desired measurements of the magnetic field. The device of this invention for measuring the distance between the two birds generally comprises a sonic transmitter placed in one of the birds and a sonic receiver placed in the other of the birds with associated apparatus in the airplane for applying a short alternating current pulse to the transmitter and simultaneously turning on a digital time interval meter to measure the time that is required for the pulse to travel to the receiver in the other bird. This time is proportional to the spacing between the birds. The time is also, however, related to the air density which must be compensated for in using the measurement when extreme accuracy is demanded. Additional factors which must be considered are that magnetic materials cannot be used in the device since they would affect the magnetometer readings. Also, direct current cannot be used since it produces a definite offset to the magnetic fields which will give an erroneous reading in the magnetometer. Furthermore, the entire system for measuring the distance between the two birds, should preferably be small in size since such birds are in themselves relatively small and seldom exceed more than a foot in diameter and several, e.g., 1–3 ft. in length. Much of the interior space is taken up with the magnetometer itself.

Figure 2:
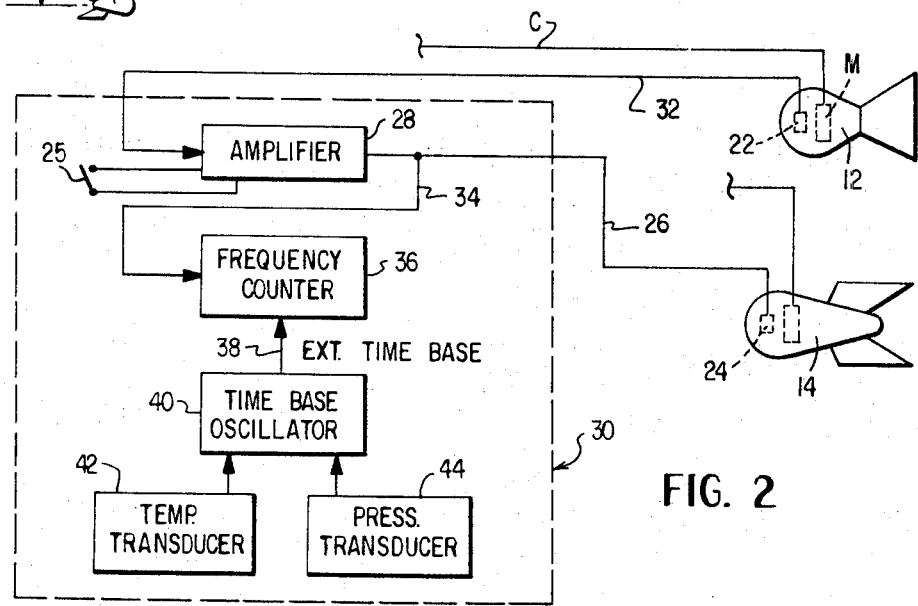
Figure 3:
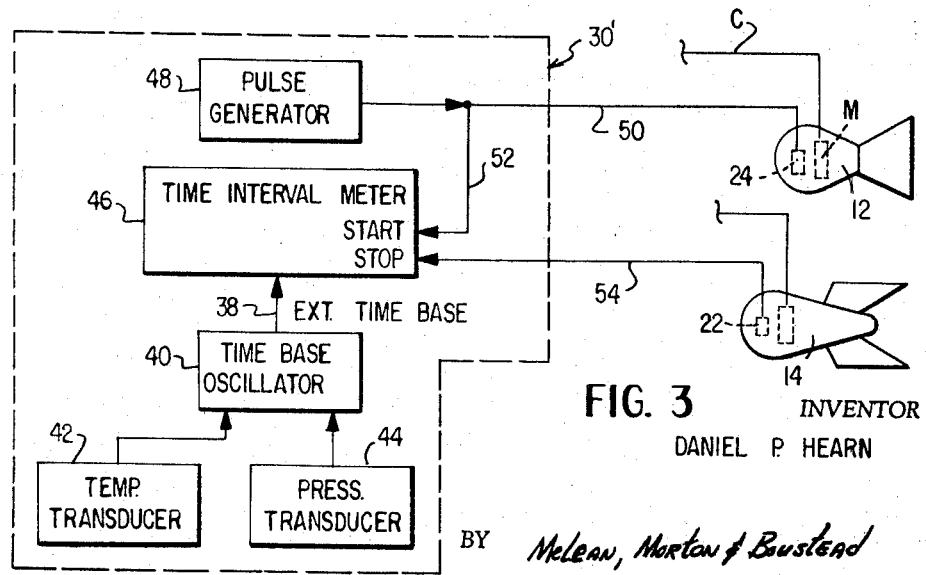

These and other objects and features of the invention will become apparent to those skilled in the art when taken in conjunction with the accompanying drawings, in which:

FIGURE 1 schematically illustrates the system of this invention;

FIGURE 2 is a diagrammatic view illustrating one embodiment of this invention; and FIGURE 3 is a diagrammatic view illustrating a modification of this invention.

Referring now to FIGURE 1, airplane 10 will fly at a predetermined height above the ground, e.g., from about 500 to several thousand feet. When flying, the airplane will drag birds 12 and 14 by means of cables 16 and 18, respectively, which electrically connect the magnetometers M (see FIGURES 2 and 3) mounted in birds 12 and 14 and the electrical equipment 20 schematically shown in the airplane 10. The construction of bird 12 as shown provides a high drag characteristic so that the bird flies essentially behind the airplane whereas the construction of bird 14 allows this bird to fly beneath the airplane according to conventional aerodynamic principles. The magnetic gradient discussed above is the difference in the magnetic field measured at the separate birds 12 and 14 divided by the spacing X between the birds. The spacing X is the distance desired to be measured in accordance with this invention. Two systems for measuring spacing X are illustrated in FIGURES 2 and 3, respectively.

Referring now to FIGURE 2, there are illustrated birds 12 and 14, each containing a magnetometer M as schematically illustrated electrically connected to the associated equipment 20 in airplane 10 (see FIGURE 1) by a conductor C in each case. Conductors C can, for example, be cables 16 and 18, respectively. Bird 12 contains a sonic receiver 22 and bird 14 contains a sonic transmitter 24. The sonic transmitter 24 produces a sonic pulse when start button 25 is pressed, which is transmitted in the direction of bird 12 to be picked up by receiver 22. The sonic pulse is created by transmitter 24 in response to an electrical pulse passed through line 26, from amplifier 28 which oscillates at a frequency related to the spacing between birds 12 and 14 as described hereinbelow. Line 26 can be passed through cable 18 to the electrical equipment 20 in the airplane. The electrical equipment 20 will include the equipment for measuring the distance generally designated in FIGURE 1 as 30. Amplifier 28 which creates the pulse in line 26 is self oscillating with a period equal to the time required for sound to travel between birds 14 and 12 since the sonic pulse, or sound, transmitted from transmitter 24 to receiver 22 is used to drive amplifier 28 whereby amplifier 28 is pulsed to produce another sonic pulse in transmitter 24 andsoforth. When a pulse is passed through line 26, the same pulse is passed through line 34 to a frequency counter 36. Accordingly, each time amplifier 28 is pulsed the frequency counter 36 counts the pulse and the number of pulses in a fixed time interval is a measure of the time required for the sonic pulse to travel from bird 14 to bird 12, i.e., distance X. Obviously frequency counter 36 could be a time interval meter, if desired. Since the velocity of transmission of the sonic pulse between transmitter 24 and receiver 22 is a function of air density and this is in turn a function of air temperature and pressure, a correction for these factors is injected into the system via an external time base input 38 from a time base oscillator 40. The time base oscillator 40 is frequency controlled by pressure transducer 44 and temperature transducer 42 so that its frequency is proportional to air density, thus correcting for air density variation, regardless of bird spacing.

The system of FIGURE 3 is similar to that of FIGURE 2, however, as illustrated the transmitter 24 is arranged in bird 12 and the receiver 22 in bird 14 since the transmitter and receiver can be in either bird. In the operation of the system of FIGURE 3, a pulse generator 48 is arranged in the equipment 30' in airplane 10 for operating the distance measuring system. Pulses from generator 48 are passed through electrical line 50 to the transmitter 24 to create sonic pulses which will be received in turn by receiver 22. A pulse transmitted through line 50 is also transmitted through line 52 to the start input of time interval meter 46 and, upon receipt of the sonic pulse at receiver 22, a pulse is generated by receiver 22 which is passed through line 54 to the stop input of the time interval meter whereby the interval meter 46 provides an accurate determination of the time required for the sonic pulse to proceed from transmitter 24 to receiver 22. As mentiond above, the time of transmission is dependent upon air density which in turn is dependent upon temperature and pressure and like the system of FIGURE 2, the system of FIGURE 3 includes an external time base applied to the time interval meter for a density correction factor. Since this system is identical with that of FIGURE 2, similar reference numerals have been applied.

It is claimed:

1. In a system for measuring a magnetic gradient in the earth's magnetic field comprising an airplane, two aerodynamic bodies dragged behind said airplane at different heights with respect to the earth's surface, each of said aerodynamic bodies containing a magnetometer for measuring the earth's magnetic field electrically interconnected with recording equipment in said airplane, the improvement of means for measuring the distance between said aerodynamic bodies comprising a sonic transmitter arranged in one of said bodies for emitting a sonic pulse and a receiver for said sonic pulse arranged in the other of said aerodynamic bodies, said transmitter and receiver being of non-magnetic material, and means in said airplane for measuring the time required for a sonic pulse to pass from said transmitter to said receiver including means for operating said transmitter to produce a sonic pulse, said time being a measure of the distance between said aerodynamic bodies so that distance variations may be corrected to provide magnetic gradient measurements accurately representing the earth's magnetic field.

2. The arrangement of claim 1 wherein said means for measuring said time comprises an amplifier for applying a pulse to said transmitter to create said sonic pulse, means electrically interconnecting said receiver and said amplifier so that said amplifier is driven by pulses passing from said receiver to said amplifier to create additional sonic pulses whereby the frequency of pulsing of said amplifier is a measure of the time required for the sonic pulse to pass between said aerodynamic bodies, and means for measuring the time between said pulses created by said amplifier.

3. The device of claim 2 wherein said means for measuring the time between said pulses is a time interval meter means having an external time base input and further including means including a frequency controlled time base oscillator electrically interconnected to a temperature transducer and a pressure transducer for applying an air density correction to said meter at said time base input.

4. The device of claim 2 wherein said means for measuring the time between said pulses is a frequency counting means having an external time base input and further including means including a frequency controlled time base oscillator electrically interconnected to a temperature transducer and a pressure transducer for applying an air density correction to said meter at said time base input.

5. The device of claim 1 wherein said means for measuring said time comprises a pulse generator applying an actuating pulse to said transmitter to create said sonic pulse, a time interval meter means for measuring the time between a start input and a stop input, means applying said actuating pulse to said time interval meter means at the start input and means for passing the pulse created by said sonic pulse in said receiver to said time interval meter means as the stop input, the time interval between said start and stop inputs being a measure of the time required for the sonic pulse to pass between said aerodynamic bodies.

6. The device of claim 5 wherein said time interval meter means has an external time base input and further including means including a frequency controlled time base oscillator electrically interconnected to a temperature transducer and a pressure transducer for applying an air density correction to said meter at said time base input.

7. In a method for measuring a magnetic gradient of the earth's magnetic field comprising measuring said field at two different points along a component of said field by magnetometers arranged in two flying aerodynamic bodies dragged at different heights behind an airplane, and recording said measurement and the distance between said bodies the improvement of a method for measuring said distance between the bodies, comprising creating a sonic pulse at one of said bodies, receiving said sonic pulse at the other of said bodies and measuring the time interval required between said transmission and receipt of said sonic pulse so that distance variations may be corrected to provide magnetic gradient measurements accurately representing the earth's magnetic field.

References Cited

UNITED STATES PATENTS

| | | | |
|---|---|---|---|
| 2,789,382 | 4/1957 | Fruengel | 340—3 |
| 3,263,161 | 7/1966 | Ruddock | 324—8 |

OTHER REFERENCES

IEEE Transactions on Sonics and Ultrasonics, vol. SU-12, No. 2, June 1965.

RUDOLPH V. ROLINEC, *Primary Examiner.*

P. A. URIBE, *Assistant Examiner.*

U.S. Cl. X.R.

324—4; 340—16; 343—10